United States Patent
Gerner et al.

(10) Patent No.: US 7,427,312 B2
(45) Date of Patent: Sep. 23, 2008

(54) INTEGRATED DEGASSING AND DEBUBBLING APPARATUS

(75) Inventors: Yuri Gerner, Mendota Heights, MN (US); Carl W. Sims, St. Paul, MN (US); Jonathan Thompson, Center City, MN (US)

(73) Assignee: Rheodyne, LLC, Rohnert Park, CA (US)

( * ) Notice: Subject to any disclaimer, the term of this patent is extended or adjusted under 35 U.S.C. 154(b) by 131 days.

(21) Appl. No.: 11/457,386

(22) Filed: Jul. 13, 2006

(65) Prior Publication Data

US 2007/0012190 A1    Jan. 18, 2007

Related U.S. Application Data

(60) Provisional application No. 60/698,729, filed on Jul. 13, 2005.

(51) Int. Cl.
*B01D 53/22* (2006.01)

(52) U.S. Cl. ............... 95/46; 95/52; 95/54; 95/247; 95/266; 96/6; 96/7; 96/8; 96/9; 96/10; 96/193; 210/640

(58) Field of Classification Search .......... 96/6, 96/7, 8, 9, 10, 155, 193; 95/45, 46, 52, 54, 95/243, 247, 266; 210/640, 188

See application file for complete search history.

(56) References Cited

U.S. PATENT DOCUMENTS

| | | | | |
|---|---|---|---|---|
| 4,325,715 A | * | 4/1982 | Bowman et al. ............... | 96/6 |
| 4,662,908 A | | 5/1987 | Suzuki et al. | |
| 5,254,143 A | * | 10/1993 | Anazawa et al. ............... | 95/46 |
| 5,340,384 A | * | 8/1994 | Sims ............................. | 96/6 |
| 5,885,332 A | | 3/1999 | Gerner et al. | |
| 6,217,634 B1 | * | 4/2001 | Dominelli et al. ............. | 95/46 |
| 6,309,444 B1 | | 10/2001 | Sims et al. | |
| 6,315,815 B1 | * | 11/2001 | Spadaccini et al. ........... | 95/46 |

(Continued)

FOREIGN PATENT DOCUMENTS

EP    1275960    1/2003

(Continued)

OTHER PUBLICATIONS

"Dual Lumen Prep/Semi-Prep Scale HPLC Vacuum Degassing Chambers", Product Data Sheet, Systec, LLC, Revision 4: May 2004.

(Continued)

*Primary Examiner*—Jason M Greene
(74) *Attorney, Agent, or Firm*—Haugen Law Firm PLLP (57) ABSTRACT

An apparatus for removing gas bubbles from a fluid includes a fluid inlet and a separation chamber that is in fluid communication with the fluid inlet. The separation chamber has first and second end portions, with the first end portion being operably oriented gravitationally above the second end portion. The apparatus further includes a first gas-permeable, liquid-impermeable membrane disposed in the separation chamber and extending substantially along a first axis defined as extending between the first and second end portions. A permeate side of the membrane is exposed to an environment having a second partial pressure of a target gas, which second partial pressure is lower than a first partial pressure of the gas in the fluid.

16 Claims, 5 Drawing Sheets

U.S. PATENT DOCUMENTS

| | | | |
|---|---|---|---|
| 6,461,407 B2 * | 10/2002 | Takamatsu et al. | 95/46 |
| 6,494,938 B2 | 12/2002 | Sims et al. | |
| 6,558,450 B2 * | 5/2003 | Sengupta et al. | 95/46 |
| 6,837,992 B2 | 1/2005 | Gerner et al. | |
| 2004/0016689 A1 | 1/2004 | Gerner et al. | |

FOREIGN PATENT DOCUMENTS

| | | |
|---|---|---|
| EP | 1078671 | 4/2003 |
| EP | 1445610 | 8/2004 |

OTHER PUBLICATIONS

"OEM Mini☆tm HPLC Vacuum Degassing Chamber", Product Data Sheet, Systec, LLC, Revision 5: Sep. 2003.

* cited by examiner

INTEGRATED DEGASSING AND DEBUBBLING APPARATUS

CROSS-REFERENCE TO RELATED APPLICATIONS

This application claims priority from U.S. Provisional Patent Application Ser. No. 60/698,729, filed on Jul. 13, 2005 and entitled "Integrated Degassing and Debubbling Apparatus", the content of which is incorporated herein in its entirety.

FIELD OF THE INVENTION

The present invention relates to systems for removing gas bubbles from fluid streams generally, and more particularly to the removal of gas bubbles from a liquid through the use of a single degassing chamber incorporating one or more gas-permeable, liquid-impermeable membranes.

BACKGROUND OF THE INVENTION

The removal of entrained gases from liquids is an important exercise in a variety of manufacturing and/or analytical processes. An example process in which liquid degassing is widely utilized is in liquid chromatography applications.

It is well known that liquid chromatography pumping systems can be prone to ingesting gas such as air into the pumping mechanism. In some cases, such gas can form bubbles that can cause a liquid chromatography pump to deliver chromatographic solvent inaccurately where one or more gas bubbles occupy volume within a positive displacement pump instead of the desired solvent fluid. In addition, gas bubbles may interfere with the proper operation of check valves which may be disposed on the inlet side of the pump. Moreover, the presence of even small amounts of dissolved gases, and in particular oxygen, interferes with the accuracy and sensitivity of chromatographic analysis. The existence of bubbles can manifest itself as erroneous absorption signatures at the chromatographic detector.

Gas infiltration into, for example, liquid chromatography solvents may originate from a variety of sources. For example, switching solvent reservoirs in a given chromatographic system can result in gas bubble formation in the solvent inlet filter, and subsequently transfer to the pump inlet during pump operation. In addition, solvent supply reservoirs and the supply lines for chromatographic systems may also be a source for gas infiltration and bubble formation. A number of other sources for gasification of fluids utilized in manufacturing and/or analytical applications are also known.

While systems for degassing liquids have been developed and implemented, such conventional systems are typically incapable of efficiently removing gas bubbles from the host liquids. For example, when a bubble is entrained in one or more lumens of a tube degassing system, the effective surface area of such degasser is decreased, thereby substantially decreasing the degassing efficiency. In addition, typical degassing systems involve a relatively low fluid flow rate therethrough, such that a gas bubble may be entrained in the degassing system for a substantial period of time. In some cases, the gas bubbles remain intact throughout the degassing system residence time, and are accordingly not removed prior to utilization of the solvent by, for example, a chromatographic system.

It is therefore a principal object of the present invention to provide a degassing system that is capable of efficiently removing gas bubbles from a liquid stream.

It is a further object of the present invention to provide an integrated apparatus capable of simultaneously degassing a liquid and efficiently removing gas bubbles from such liquid.

SUMMARY OF THE INVENTION

By means of the present invention, apparatus and methods are provided for efficiently removing gas bubbles from a mixed fluid having both liquid and gas species present. The apparatus of the present invention utilizes gravitationally-oriented separation chambers, which enable relatively lower density gas bubbles to separate from the relatively higher density host liquid through relative buoyancy forces. Once such gravitational separation has occurred, gas is removed from the separation chamber through a gas-permeable, liquid-impermeable membrane having a partial pressure gradient of the target gas thereacross.

In some embodiments, such partial pressure gradient is enabled by evacuation of the environment on a permeate side of the separation membrane. In some embodiments, an additional degassing chamber is provided with a separate membrane, such that an integrated debubbling/degassing apparatus is provided.

In a particular embodiment, the apparatus of the present invention includes a fluid inlet and a separation chamber that is in fluid communication with the fluid inlet. The separation chamber has first and second end portions, with the first end portion being operably oriented gravitationally above the second end portion. The apparatus preferably further includes a first gas-permeable, liquid-impermeable membrane disposed in the separation chamber and extending substantially along a first axis defined as extending between the first and second end portions. A permeate side of the membrane is exposed to an environment having a second partial pressure of a target gas, which second partial pressure is lower than a first partial pressure of the gas found in the fluid being treated.

In some embodiments, the apparatus includes a second gas-permeable, liquid-impermeable membrane having a retentate side and a permeate side, with the retentate side of the second membrane being in fluid communication with the fluid outlet. The permeate side of the second membrane may be exposed to an environment having a third partial pressure of the gas, which third partial pressure is lower than an outlet partial pressure of the gas in the fluid at the fluid outlet. Such first and second membranes may be disposed in a single module.

In another embodiment, the fluid degassing apparatus of the present invention includes a fluid inlet and a separation chamber that is in fluid communication with the fluid inlet. The separation chamber has first and second end portions, with the first end portion being operably oriented gravitationally above the second end portion. The apparatus preferably further includes a first gas-permeable, liquid-impermeable membrane having a permeate side and a retentate side, and is disposed in the separation chamber. The apparatus also includes a second gas-permeable, liquid-impermeable membrane having a permeate side and a retentate side, and is disposed in a degassing chamber that is fluidly disconnected from the separation chamber. The retentate sides of the first and second membranes are preferably fluidly coupled to one another.

In a further aspect of the present invention, a method is provided for removing gas bubbles from a fluid, wherein the method includes providing a module having a fluid inlet and a separation chamber that is in fluid communication with the fluid inlet. The separation chamber has first and second end portions, with the first end portion being operably oriented gravitationally above the second end portion. The module also includes a first gas-permeable, liquid-impermeable membrane disposed in the separation chamber and extending substantially along a first axis defined as extending between the first and second end portions. The method involves fluidly coupling a permeate side of the first membrane to a vacuum source and contacting a retentate side of the first membrane with the fluid.

DETAILED DESCRIPTION OF THE PREFERRED EMBODIMENTS

Figure 1:
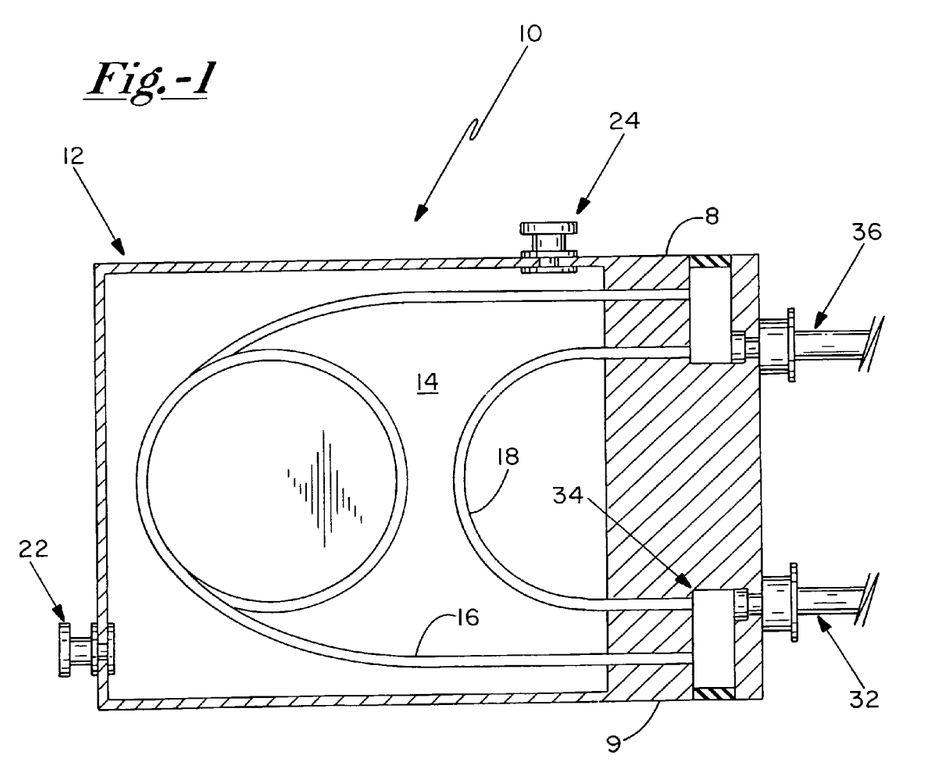
FIG. 1 is a cross-sectional side view of a debubbling/degassing apparatus of the present invention.

The degassing and debubbling apparatus 10 of the present invention as illustrated in FIG. 1 includes a single module 12 having a degassing chamber 14 through which fluid conveyance members 16, 18 pass. In the embodiment illustrated in FIG. 1, module 12 includes two distinct fluid conveyance members 16, 18 which are preferably fabricated as tubes comprising gas-permeable, liquid-impermeable material. Example materials that are useful in manufacturing gas-permeable, liquid-impermeable conveyance members 16, 18 include, for example, fluorinated polymers, including perfluorinated copolymers such as Teflon AF® 2400, available from E.I. du Pont de Nemours and Company. Other materials, such as microporous structures like microporous propylene, may instead or additionally be utilized in the gas-permeable, liquid-impermeable membranes of the present invention.

Degassing chamber 14 is configured and provided to cause gaseous species being transported therethrough in conveyance members 16, 18 to be drawn out through the gas-permeable, liquid-impermeable membranes formed by respective walls of conveyance members 16, 18. The so-removed gaseous species are subsequently expelled from degassing chamber 14 through outlet 22. In some embodiments, such gas removal is effected by holding degassing chamber 14 at a reduced internal pressure by coupling degassing chamber 14 to a vacuum source (not shown). The vacuum source is preferably operably connected to outlet 22, such that gaseous species removed from the fluid through the respective gas-permeable, liquid-impermeable membranes of conveyance members 16, 18 may be expelled from degassing chamber 14. In addition, the connection of a vacuum source to outlet 22 maintains degassing chamber 14 at a lower partial pressure of a target gaseous species than the corresponding gaseous species partial pressure within the fluid being transported by conveyance members 16, 18. Through such a partial pressure gradient, the target gas is caused to be removed from the fluid.

In other embodiments of the present invention, the gas removal is effected by passing a sweep fluid over and about fluid conveyance members 16, 18 in degassing chamber 14, with fresh sweep fluid being continuously or periodically introduced and expelled from degassing chamber 14. In the embodiment illustrated in FIG. 1, a sweep fluid inlet 24 to degassing chamber 14 may be provided for continuously or periodically injecting fresh sweep fluid into degassing chamber 14. Preferably, such sweep fluid inlet 24 is positioned at module 12 substantially opposite from outlet 22, such that the sweep fluid passes through substantially the entire volume of degassing chamber 14 to effectively sweep removed gaseous species out from degassing chamber 14. The sweep fluid utilized in removing gaseous species from the fluid preferably has a lower partial pressure of the target gaseous species than the corresponding gaseous species' partial pressure within the fluid to be degassed. As in the reduced total pressure environment described above, the sweep fluid creates a partial pressure gradient that causes the target gaseous species to be removed from the fluid being degassed. Once the target gaseous species is removed through respective fluid conveyance members 16, 18, such gaseous species are expelled from degassing chamber 14 through outlet 22.

In the embodiment illustrated in FIG. 1, the fluid to be degassed is introduced to module 12 at a mixed fluid inlet 32, which directs the gas-containing fluid to a separation chamber 34. The effectiveness of separation chamber 34 in separating the gas from the liquid is typically dependent, at least in part, upon the physical orientation of module 12, wherein upper surface 8 of module 12 is positioned gravitationally above lower surface 9 thereof. In such an orientation, gravitational force causes the gas bubbles (having a lower relative density than the liquid) to be at least partially separated from the liquid and drawn into first fluid conveyance member 18, while the relatively higher density liquid falls downwardly into second fluid conveyance member 16. Through such a separation, fluid conveyance member 18 is dedicated to receive primarily gas from the bubbles separated from the mixed liquid stream at separation chamber 34.

In order to further effectuate separation of gas bubbles from the liquid, fluid conveyance member 18 may have an inside diameter that is smaller than the inside diameter of fluid conveyance member 16. The relatively small inside diameter of fluid conveyance member 18 acts to inhibit entry of liquid therein due to surface tension characteristics of the liquid. Accordingly, the liquid is preferentially directed into fluid conveyance member 16, while the gas bubbles may freely enter fluid conveyance member 18. In a particular embodiment, the inside diameter of fluid conveyance member 18 is about 0.02 mm, while the inside diameter of fluid conveyance member 16 is about 5 mm. The dimensions identified above, however, are not intended to be restrictive of the actual or relative dimensions utilized in apparatus 10 of the present invention.

As described above, the respective fluids being transported by fluid conveyance members 16, 18 through degassing chamber 14 are degassed of at least target gaseous species. To effectively do so, such conveyance members 16, 18 may be of any desired length to provide for adequate exposure time of the fluid to the environment within degassing chamber 14 prior to exiting therefrom at degassed fluid outlet 36. Accordingly, fluid conveyance members 16, 18 may be formed into coils or other configurations which increase total residence time of the respective fluids within degassing chamber 14, and surface area exposure of the gas-permeable membranes to the environment within degassing chamber 14. In preferred embodiments, therefore, the fluid exiting from module 12 at outlet 36 is primarily degassed liquid.

Figure 2:
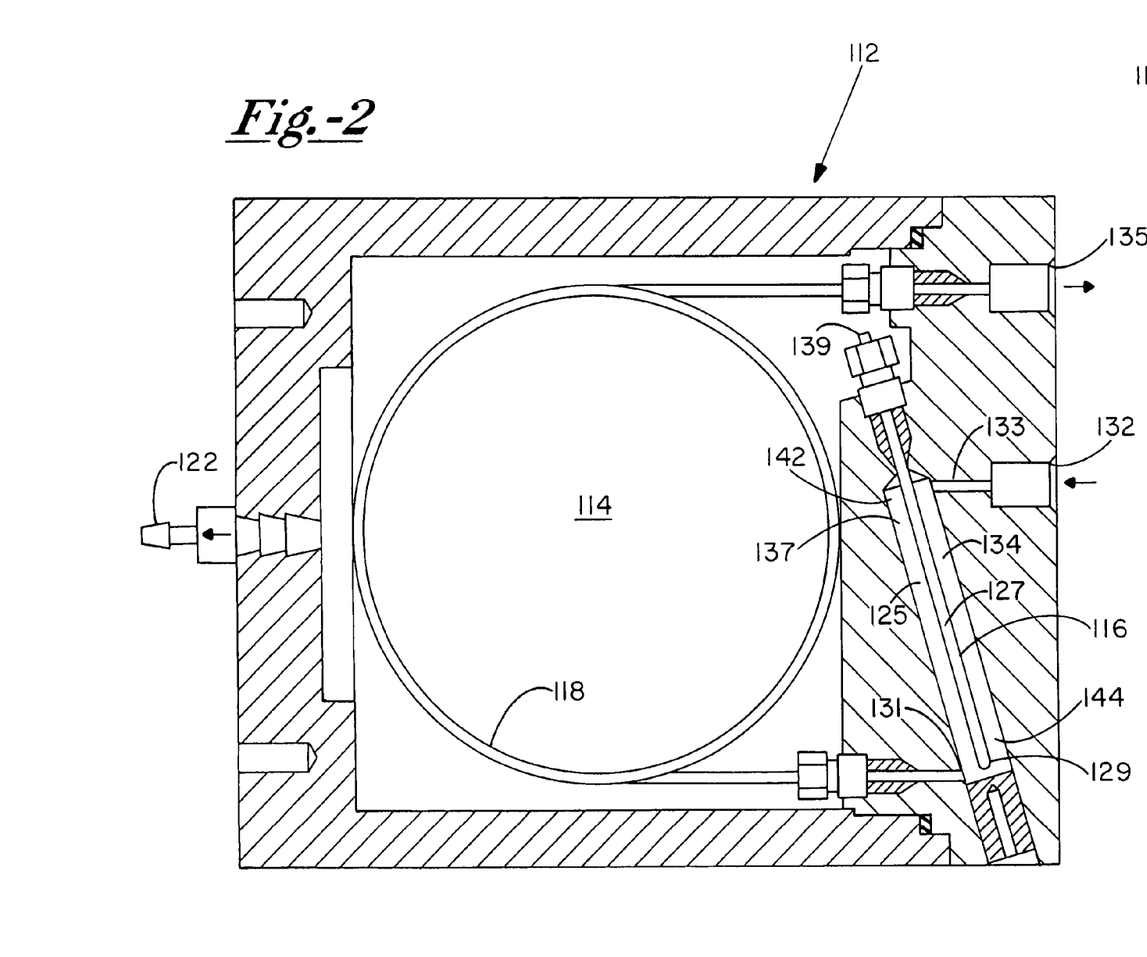
FIG. 2 is a cross-sectional side view of a debubbling/degassing apparatus of the present invention.
Figure 3:
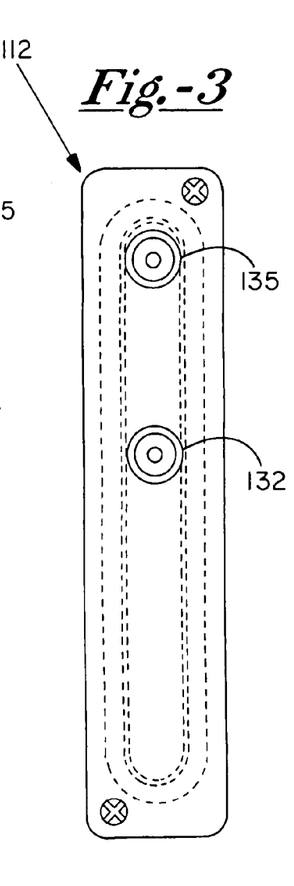
FIG. 3 is an end view of the apparatus illustrated in FIG. 2.

Another embodiment of the integrated degassing and debubbling apparatus of the present invention is illustrated in FIGS. 2 and 3, wherein module 112 includes a degassing chamber 114 and a separation chamber 134. The mixed fluid is preferably introduced to module 112 at mixed fluid inlet 132, and is transported to separation chamber 134 via inlet conveyance member 133.

As in the orientation criticality of apparatus 10 as shown in FIG. 1, module 112 is preferably oriented such that upper end 142 of chamber 134 is positioned gravitationally above lower end 144 thereof. Through such an arrangement, the liquid portion of the mixed fluid entering separation chamber 134 cascades downwardly through separation chamber 134 and is drawn out therefrom at degassing inlet 131. Meanwhile, gas (having a lower relative density than the liquid) remains at or near an upper portion 137 of separation chamber 134

Separation chamber 134 preferably includes a membrane 116 disposed therein for separating gas from the fluid. As described above, membrane 116 is preferably a gas-permeable, liquid-impermeable body so that gaseous species may be drawn through membrane 116 into an environment having a lower gaseous species partial pressure than the corresponding partial pressure on the retentate side 125 of membrane 116. Membrane 116 may be variously configured, including in the form of tubing of various diameters and wall thicknesses, which tubing may be defined in a straight line, spiraled, or other desired configurations.

To effectuate a partial pressure gradient as between retentate side 125 of membrane 116 and permeate side 127 thereof, permeate side 127 may be operably coupled to reduced pressure environment, such as within degassing chamber 114. In such an embodiment, membrane 116 forms a permeate side chamber that is open to degassing chamber 114 at gas outlet 139. In the embodiment illustrated in FIG. 2, therefore, permeate side 127 of membrane 116 is a chamber closed at first end 129, and open at gas outlet 139. Degassing chamber 114 may then be operably coupled to a vacuum source (not shown) at a vacuum port 122, such that degassing chamber 114 may selectively be provided with a reduced pressure.

Through the arrangement illustrated in FIG. 2, gas is drawn from retentate side 125 through membrane 116 to permeate side 127, and subsequently out through gas outlet 139 into degassing chamber 114, and out therefrom through vacuum ports 122. The gravitational orientation of separation chamber 134 enables gas bubbles to separate from the mixed fluid, and remain at upper portion 137 of separation chamber 134 due to the relatively lower density of the gas bubbles. As a result, the separated gas bubbles may be retained in upper portion 137 of separation chamber 134 for a significant period of time, and preferably a sufficient period of time in order to allow transfer through membrane 116.

Separation chamber 134 is preferably formed with a sufficient volume so as to accommodate a retentate side 125 that maintains a fluid level gravitationally above degassing inlet 131. The volume of retentate side 125 is therefore dependent upon the mixed fluid flow rate through separation chamber 134, the surface area and degassing efficiency of membrane 116, and the concentration of a target gas in the mixed fluid entering module 112 at fluid inlet 132. In one embodiment of the invention, separation chamber 134 has a diameter of about 6 mm and a length of about 50 mm. In such embodiment, membrane 116 is formed as a tube having a closed end at end 129, and an outer diameter of about 1.5 mm. Such dimensions have proven useful for removing gas bubbles from fluids at a flow rate of up to about 10 ml per minute, but possibly more depending upon the volumetric concentration of gas desired to be removed from the fluid.

As further illustrated in FIG. 2, module 112 may optionally be provided with an integrated degassing functionality, wherein fluid conveyance member 118 is operably coupled between degassing inlet 131 and fluid outlet 135. Fluid conveyance member 118 operates in a similar fashion as fluid conveyance members 16, 18 described with reference to FIG. 1. In particular, the wall of fluid conveyance member 118 is preferably gas-permeable, liquid-impermeable, so as to facilitate gas transfer through the boundary wall thereof into degassing chamber 114. Such gas transfer may be driven by relatively lower partial pressures of target gases in degassing chamber 114, as compared to the respective target gas partial pressures in the fluid passing within fluid conveyance member 118. In some embodiments, such partial pressure gradient is enabled through a reduced pressure environment in degassing chamber 114, which reduced pressure environment is created through operable coupling to a vacuum source (not shown) through vacuum port 122. The embodiment of module 112 illustrated in FIG. 2 therefore provides an integrated fluid degassing and debubbling apparatus.

Figures 4A, 4B, 4C:
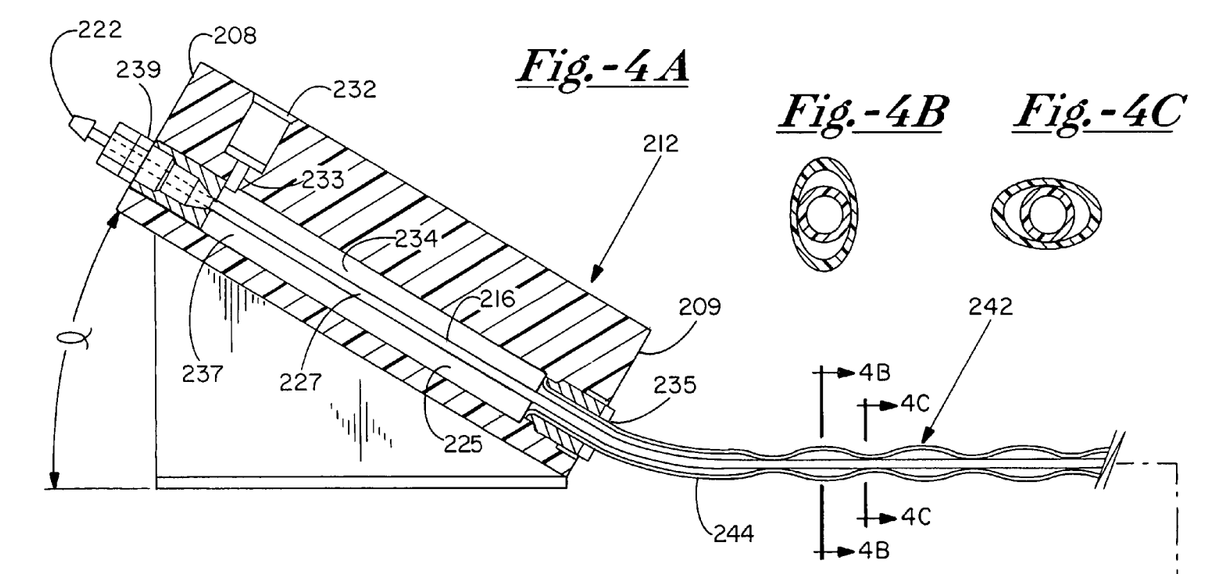
FIG. 4A is a cross-sectional side view of a debubbling/degassing apparatus of the present invention.
FIG. 4B is a cross-sectional end view of a portion of the debubbling/degassing apparatus illustrated in FIG. 4A.
FIG. 4C is a cross-sectional end view of a portion of the debubbling/degassing apparatus illustrated in FIG. 4A.

A still further embodiment of the present invention is illustrated in FIG. 4, wherein module 212 includes a separation chamber 234 disposed therein. The mixed fluid is preferably introduced to module 212 at mixed fluid inlet 232, and is transported to separation chamber 234 via inlet conveyance member 233. Module 212 is preferably oriented such that first end 208 is positioned gravitationally above second end 209, wherein a prevailing mass force, such as gravitational force "g", is directed at least partially from first end 208 to second end 209. Through such an orientation, the liquid portion of the mixed fluid entering separation chamber 234 flows downwardly therethrough and out through outlet 235 into transfer line degassing apparatus 242. In the embodiment illustrated in FIG. 4, a gas-permeable, liquid-impermeable membrane 216 is disposed in separation chamber 234. Permeate side 227 of membrane 216 may be maintained at a reduced internal pressure so as to create a partial pressure gradient relative to the mixed fluid disposed at retentate side 225 of membrane 216. As such, gaseous portions of the mixed fluid passing through separation chamber 234 are drawn through a membrane 216, and out from module 212 at vacuum source port 222. The orientation of module 212 with first end 208 gravitationally above second end 209 enables the gaseous species (having a relative lower density than the liquid) to remain at or near an upper portion 237 of separation chamber 234 during the debubbling/degassing operation, and ultimately drawn out from separation chamber 234 at port 222.

In the embodiment illustrated in FIG. 4, module 212 may be operably disposed at an orientation angle α of between about 5 and 90°, and more preferably between about 20 and 45°. Such an orientation enables the buoyancy effect on the gaseous species described above, as well as provides for a liquid residence time within separation chamber 234 that is sufficient to enable the debubbling/degassing of the mixed fluid passing therethrough. The value of operational angle α has a direct effect upon the residence time of the fluid within separation chamber 234, with steeper operation angles accelerating the passage of liquid through separation chamber 234 through more direct gravitational effects.

Module 212 may be operably coupled to a transfer line degassing apparatus 242, such as the apparatus described in our co-pending U.S. patent application Ser. No. 10/702,013 entitled "AXIAL DEGASSING TRANSFER LINES", and Ser. No. 10/981,934 entitled "AXIAL TRANSFER LINE DEGASSING", the contents of which are herein incorporated by reference. By operably coupling module 212 to such a transfer line degassing apparatus, gas bubbles entrained within the mixed fluid are primarily removed prior to being delivered to the transfer line degassing apparatus. As such, the degassing efficiency of the transfer line degassing apparatus is substantially enhanced.

In the embodiment illustrated in FIG. 4, transfer line degassing apparatus 242 includes a gas-permeable, liquid-impermeable membrane 216, which is an extension of membrane 216 disposed in separation chamber 234. In some embodiments, membrane 216 is in the form of a tube that extends from separation chamber 234 into transfer line degassing apparatus 242. In this embodiment, the tube formed by membrane 216 has a closed end 229, and an open end fluidly coupled to vacuum source port 222. As such, permeate side 227 of membrane 216 is maintained at a reduced pressure through at least partial evacuation thereof. In a particular aspect of transfer line degassing apparatus 242, enclosure member 244 may be provided with a non-cylindrical configuration. In the illustrated embodiment, outer member 244 is formed with alternating cross-sectional configurations, as shown in FIGS. 4B and 4C. Such alternating cross-sectional configurations assist in minimizing laminar flow through apparatus 242, so as to maximize degassing efficiency thereof. In particular, the configuration of outer member 244 promotes fluid mixing, which correspondingly makes entrained gases more available for removal through membrane 216.

Outer member 244 may be fabricated from a variety of materials. Example materials useful in the production of outer member 244 include Tefzel®, PEEK, PTFE and the like. In some embodiments, outer member 244 is both gas and liquid impermeable. Such impermeability, however, is not a required characteristic of outer member 244. As described in our co-pending patent applications, transfer line degassing apparatus 242 may preferably be sufficiently flexible so as to be readily manipulatable into desired configurations. To do so, therefore, both outer member 242 and membrane 216 are desirably operationally flexible.

Figure 5A:
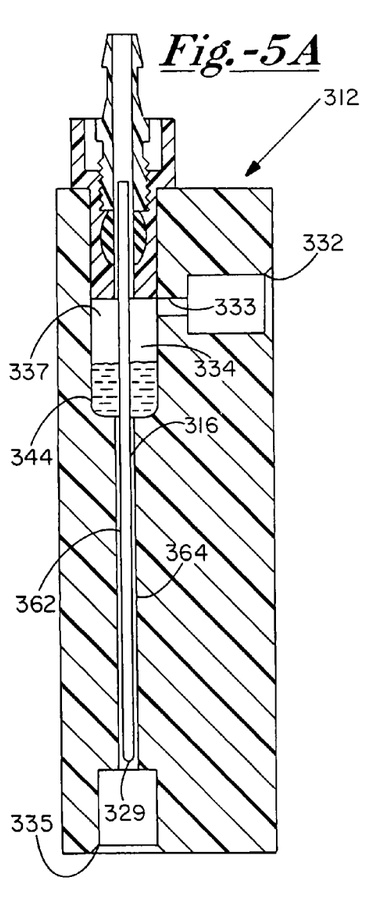
FIG. 5A is a cross-sectional side view of a debubbling/degassing apparatus of the present invention.
Figure 5B:
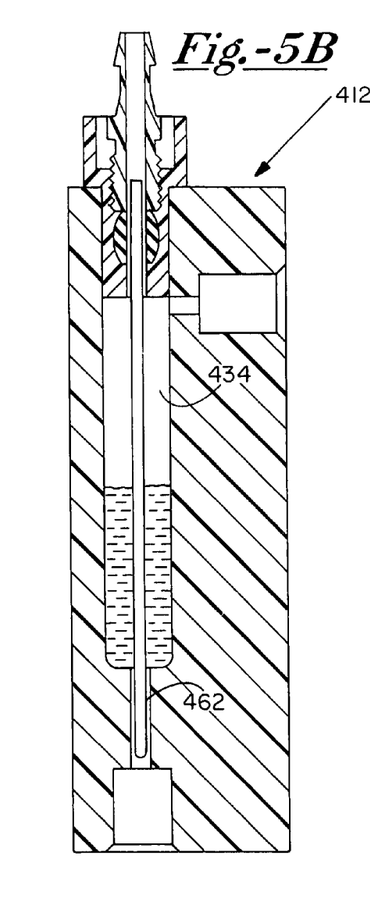
FIG. 5B is a cross-sectional side view of a debubbling/degassing apparatus of the present invention.

Additional example embodiments of the degassing/debubbling apparatus of the present invention are illustrated in FIGS. 5A-5E. Module 312 is illustrated in FIG. 5A as including a separation chamber 334 disposed therein. The mixed fluid is preferably introduced to module 312 at fluid inlet 332, and is transported to separation chamber 334 via inlet conveyance member 333. As described with reference to the previous embodiments, module 312 is preferably operably oriented such that first end portion 337 of separation chamber 334 is positioned gravitationally above second end portion 344 of separation chamber 334. As described above, the separation chambers of the present invention are desirably configured to enable gas bubble/liquid separation, and to accommodate a mixed inlet fluid flow rate such that the separated gas bubbles remain essentially at first end portion 337 of separation chamber 334. Such an arrangement maximizes debubbling performance of the systems of the present invention.

In the embodiment illustrated in FIG. 5A, membrane 316 extends beyond second end portion 344 of separation chamber 334 within a degassing chamber bore 362 extending from separation chamber 334. In some embodiments, degassing chamber bore 362 fluidly couples separation chamber 334 to fluid outlet 335, such that fluid exiting from fluid outlet 335 is processed throughout a length of membrane 316. Degassing chamber bore 362 may be smaller in diameter than separation chamber 334 in order to maximize fluid surface contact with membrane 316. In some embodiments, the cross-sectional dimension of degassing chamber bore 362 is too small to efficiently separate gas bubbles from the host liquid. As a result, one preferred embodiment of the present invention incorporates both a separation chamber 334 and a degassing chamber bore 362.

Separation chamber 334 may have a diameter of at least about 3 mm, while degassing chamber bore 362 may have a diameter utilizing the clearances described herein. In the embodiment illustrated in FIG. 5a, membrane 316 is formed as a tube with end 329 being closed. Typically, it is desired that a clearance of between about 0.1 and 1 millimeter is provided between membrane 316 and wall 364 of degassing chamber bore 362. Such a clearance enables consistent fluid flow through degassing chamber bore between wall 364 and membrane 316 for a variety of fluids. Other dimensions for separation chamber 334 and/or degassing chamber bore 362 are contemplated by the present invention as desired per application. Separation chamber 334, for example, is illustrated in FIG. 5a as having a relatively shorter length dimension than separation chamber 434 of module 412 illustrated in FIG. 5b. Module 412 correspondingly incorporates a relatively shorter degassing chamber bore 462. The distinctions between module 312 and module 412 illustrate structural modifications that may be made to the apparatus of the present invention in order to accommodate various fluid flow regimes. Module 312 may be utilized, for example, in applications requiring a relatively lesser extent of debubbling functionality as compared to the application utilizing module 412. Since separation chamber 434 of module 412 is significantly larger than separation chamber 334, a relatively greater extent of gas bubble separation capacity is enabled through the configuration of module 412, compared to module 312. On the other hand, module 312 exhibits greater fluid degassing capacity at degassing chamber bore 362, than the capacity exhibited at degassing chamber bore 462 of module 412, due to the relative dimensions thereof.

Figure 5C:
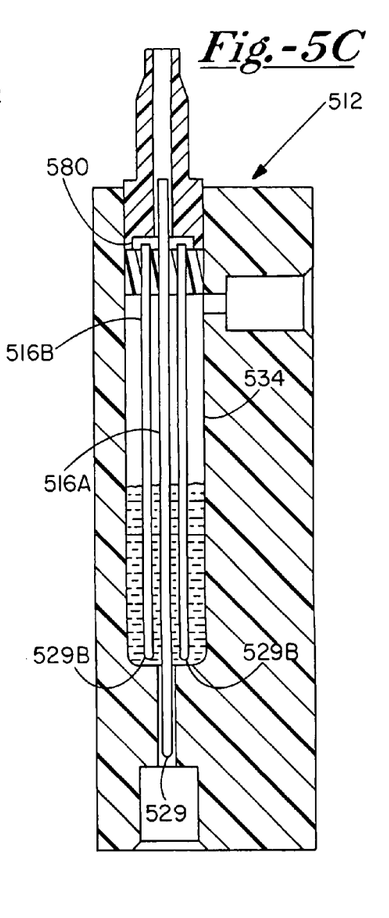
FIG. 5C is a cross-sectional side view of a debubbling/degassing apparatus of the present invention.
Figure 5D:
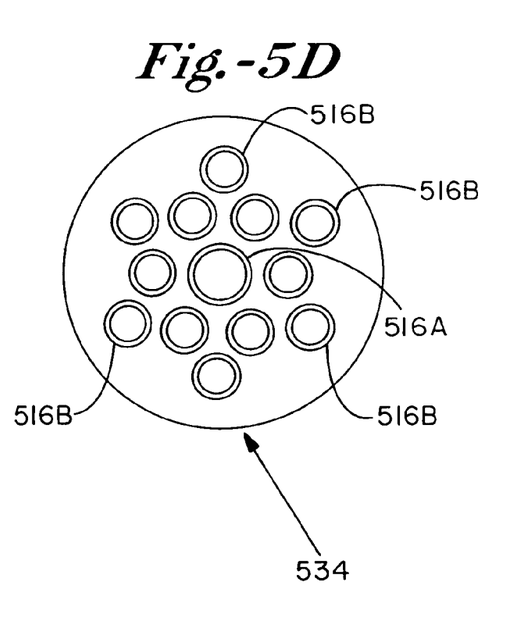
FIG. 5D is a cross-sectional end view of the debubbling/degassing apparatus illustrated in FIG. 5C.

An additional alternative embodiment of the present invention is illustrated in FIGS. 5C and 5D, wherein module 512 includes a plurality of distinct membranes 516A, 516B. Though it is contemplated by the present invention to provide a variety of configurations and numbers of distinct membranes in a single module, the illustrated embodiment includes a central tubular membrane 516A with a closed end 529, and several peripheral tubular membranes 516B, each having respective closed ends 529B. In one embodiment, each of such membranes 516A, 516B are operably coupled to a vacuum source (not shown) through a manifold 580 in a membrane coupling arrangement. Various membrane coupling arrangements may be utilized in the present invention, and examples of such coupling arrangements are illustrated in the drawing figures. Separation chamber 534 of module 512 is illustrated in a cross-sectional top view in FIG. 5D.

Figure 5E:
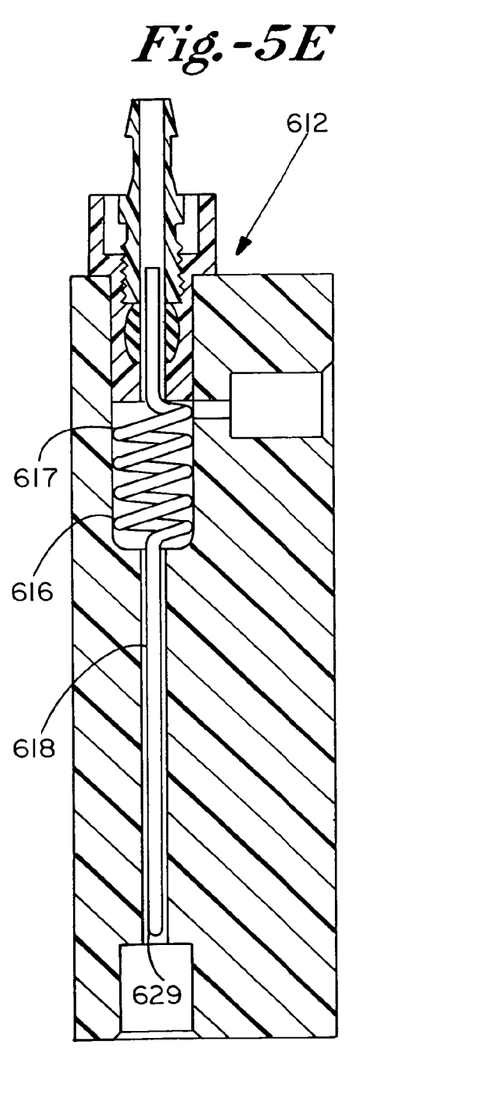
FIG. 5E is a cross-sectional side view of a debubbling/degassing apparatus of the present invention.

Module 612 is illustrated in FIG. 5E as having a further alternative configuration for membrane 616. As illustrated in FIG. 5E, upper portion 617 of membrane 616 is formed as a coiled tube, while lower portion 618 of membrane 616 is formed as a straight tubular member with a closed end 629. Coiled upper portion 617 of membrane 616 increases the surface area of membrane material exposed to the mixed fluid for enhanced debubbling and degassing efficiency. It is contemplated by the present invention, however, that a variety of configurations for membrane 616 may be incorporated in the apparatus of the present invention, with the primary goal of such membranes being to effectively remove gaseous species from a fluid stream.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different methods/devices and that various modifications can be accomplished without departing from the scope of the invention itself.

What is claimed is:

1. An apparatus for removing gas bubbles from a liquid-containing fluid wherein said gas exerts a first partial pressure on said fluid, said apparatus comprising:
   (a) a fluid inlet;
   (b) a separation chamber in fluid communication with said fluid inlet, said separation chamber having first and second end portions, with said first end portion being operably oriented gravitationally above said second end portion, said fluid inlet communicating with said separation chamber at said first end portion, and a retentate fluid outlet disposed at said second end portion; and
   (c) a first gas-permeable, liquid-impermeable membrane disposed in said separation chamber and extending substantially along a first axis defined as extending between said first and second end portions, a permeate side of said membrane being exposed to an environment having a second partial pressure of said gas, which second partial pressure is lower than said first partial pressure, such that said liquid-containing fluid is operably separated by said membrane into a permeate gas and a retentate fluid.

2. An apparatus as in claim 1, including a second gas-permeable, liquid-impermeable membrane having a retentate side and a permeate side, said retentate side of said second membrane being in liquid communication with said retentate fluid outlet, and said permeate side of said second membrane being exposed to an environment having a third partial pressure of said gas, which third partial pressure is lower than an outlet partial pressure of said gas in said retentate fluid at said retentate fluid outlet.

3. An apparatus as in claim 2 wherein said third partial pressure is substantially equal to said second partial pressure.

4. An apparatus as in claim 2 wherein said first and second membranes are disposed in a single module.

5. An apparatus as in claim 1 wherein said first membrane is tube-shaped.

6. An apparatus as in claim 5 wherein said tube-shaped membrane includes a closed end at said second end portion.

7. An apparatus as in claim 1 wherein said permeate side of said first membrane is fluidly coupled to a vacuum source.

8. An apparatus as in claim 2 wherein said permeate side of said second membrane is fluidly coupled to a vacuum source.

9. A fluid degassing apparatus, comprising:
   (a) a fluid inlet;
   (b) a separation chamber in fluid communication with said fluid inlet, said separation chamber having first and second end portions, with said first end portion being operably oriented gravitationally above said second end portion;
   (c) a first gas-permeable, liquid-impermeable membrane having a permeate side and a retentate side, and being disposed in said separation chamber;
   (d) a second gas-permeable, liquid-impermeable membrane having a permeate side and a retentate side, and being disposed in a degassing chamber that is liquidly disconnected from said separation chamber, said retentate sides of said first and second membranes being fluidly coupled to one another.

10. A fluid degassing apparatus as in claim 9 wherein said permeate sides of said first and second membranes are fluidly coupled to a vacuum source.

11. A fluid degassing apparatus as in claim 10 wherein said first and second membranes are disposed in a single module.

12. A fluid degassing apparatus as in claim 9 wherein said first membrane extends substantially along a first axis defined as extending between said first and second end portions.

13. A fluid degassing apparatus as in claim 12 wherein said first membrane is substantially tube-shaped having a closed end at said second end portion, and an open end at said first end portion.

14. A method for removing gas bubbles from a liquid-containing fluid, said method comprising:
   (a) providing a module having:
      (i) a fluid inlet;
      (ii) a separation chamber in fluid communication with said fluid inlet, said separation chamber having first and second end portions, with said first end portion being operably oriented gravitationally above said second end portion, said fluid inlet communicating with said separation chamber at said first end portion, and a retentate fluid outlet disposed at said second end portion;
      (iii) a first gas-permeable, liquid-impermeable membrane disposed in said separation chamber and extending substantially along a first axis defined as extending between said first and second end portions;
   (b) fluidly coupling a permeate side of said membrane to a vacuum source; and
   (c) contacting a retentate side of said membrane with said fluid, such that said liquid-containing fluid is operably separated by said membrane into a permeate gas and a retentate fluid.

15. A method as in claim 14, including gravitationally separating said gas bubbles from said fluid in said separation chamber.

16. A fluid degassing apparatus, comprising:
   (a) a first portion including a separation chamber having first and second end sections, with said first end section being operably oriented gravitationally above said second end section, said separation chamber further including a fluid inlet disposed at said first end section;
   (b) a second portion fluidly coupled to, and disposed downstream from, said first portion, said second portion being sufficiently flexible so as to be readily manipulatable into desired configurations; and
   (c) a first gas-permeable, liquid-impermeable membrane extending within said first and second portions, and extending substantially along a first axis defined as extending between said first and second end sections of said separation chamber, first membrane operably separating a liquid-containing fluid into a permeate gas and a retentate fluid.

* * * * *